UNITED STATES PATENT OFFICE.

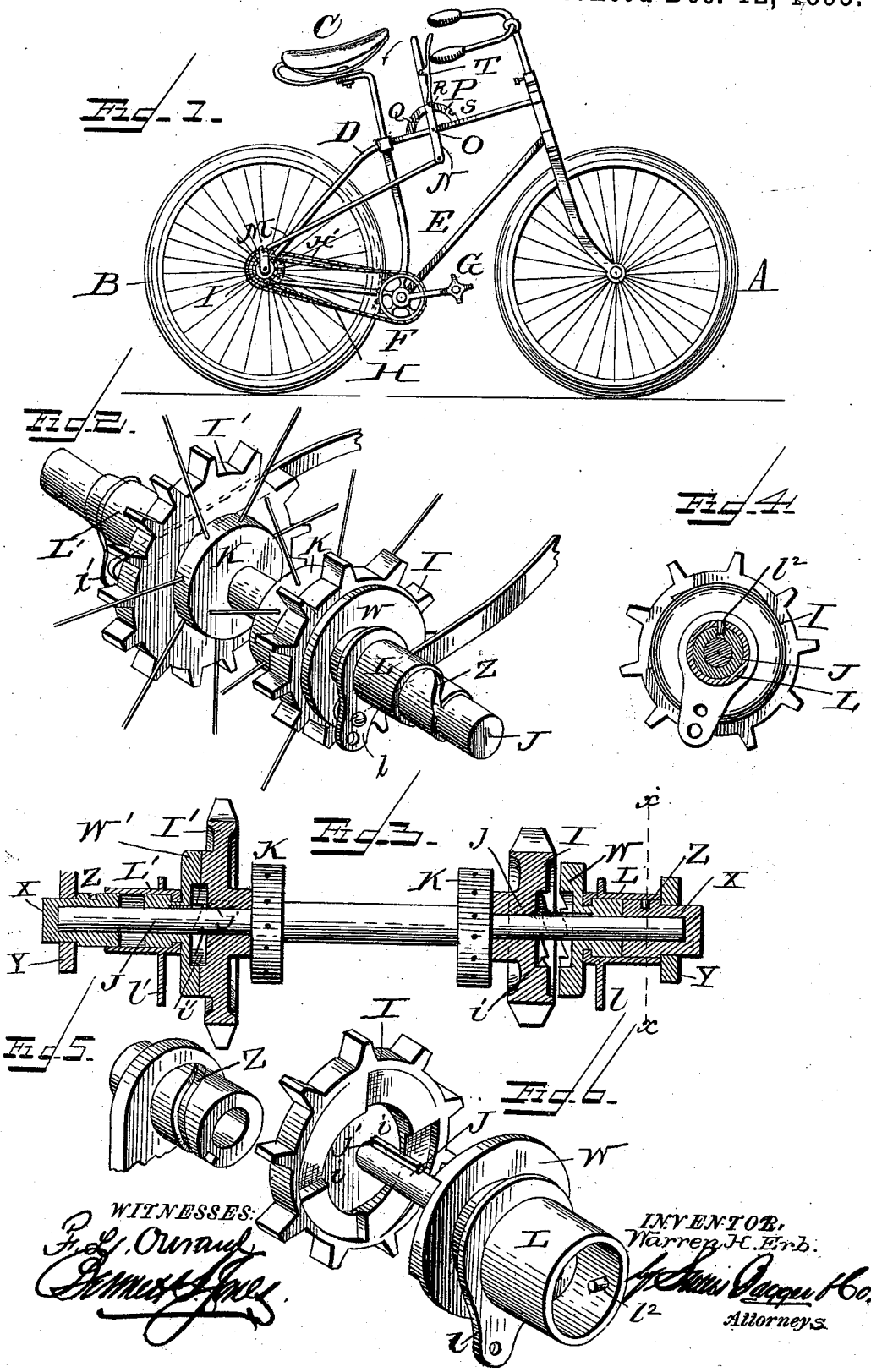

WARREN H. ERB, OF NEW YORK, N. Y.

BICYCLE.

SPECIFICATION forming part of Letters Patent No. 510,502, dated December 12, 1893.

Application filed December 17, 1892. Serial No. 455,539. (No model.)

*To all whom it may concern:*

Be it known that I, WARREN H. ERB, a citizen of the United States, and a resident of New York, in the county of New York and State of New York, have invented certain new and useful Improvements in Bicycles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of a bicycle equipped with my improved attachment. Fig. 2 is a perspective detail view of the attachment, *per se*, removed from the bicycle. Fig. 3 is a longitudinal sectional view through the hind axle of the bicycle. Fig. 4 is a cross section on line $x$—$x$, Fig. 3. Fig. 5 is a perspective detail view of the fixed clutch bearing on which works the sliding sleeve; and Fig. 6 is a perspective view of the sliding clutch, showing also the contiguous face of the sprocket wheel.

Like letters of reference denote corresponding parts in all the figures.

This invention relates to the propelling mechanism of bicycles, and has for its object to so construct the same that, first, the sprocket wheels may be entirely disengaged from the running or propelling wheels of the machine; and, second, these running or propelling wheels may be so connected to the pedals as to propel the machine either at a low speed with considerable propelling power, as, for example, when going up hill, or at a comparatively high speed with low propulsory power, as, for example, when going straight ahead on level ground.

With these objects in view, my invention consists in the combined pedaling and clutch arrangement which will be hereinafter more fully described and claimed.

Referring to the accompanying drawings, the letter A designates the front wheel, and B the hind wheel, or driving wheel, of a bicycle, which may be of any improved construction.

The letter C designates a saddle, and D the upper bar of the frame, while E designates the lower.

The letter G designates the pedals and H, H', the driving chains, the latter passing over wheels F, F', on the pedal or crank shaft.

Instead of having only one sprocket wheel, I, engaging with the chain, H, I employ two, viz., I and I', as shown in Figs. 2 and 3, each with its appropriate drive chain, H and H', mounted upon and revolving with a common axle. Upon the drive shaft, J, of the hind wheel, or drive wheel, B, revolve loosely two sprocket wheels, I and I', one of which, I, is of smaller diameter than the other, I'. The spokes of the drive wheel are fastened in the hubs, K, as usual.

The drive shaft, J, is provided at opposite ends with a sliding sleeve, L and L', both of which are connected by arms, M, with a lever, N, having its fulcrum at O in the upper frame bar, D. Upon this bar is placed a segment, P, having three notches, designated, respectively, by the reference letters Q, R and S, each of these three notches being adapted to engage a spring actuated pawl or detent, T, upon the lever, U, the upper end or handle of said lever being within convenient reach of the person occupying the saddle, C. Each of the sliding sleeves or collars, L and L', has a downwardly projecting arm, $l$ and $l'$, to which are articulated arms or connecting rods, M, converging at their front ends where they are articulated to the lower end of lever, N, below its fulcrum, O. Each sleeve, L and L', is, moreover, provided at its inner end, facing its appropriate sprocket wheel, with a clutch, W and W', adapted to engage slanting projecting shoulders or offsets upon their respective sprocket wheels, I and I', which said shoulders are designated by the reference letters $i$ and $i'$. Each of the sliding collars, L and L', has projecting inwardly a pin, $l^2$, which projects into and engages with a sleeve, X, fastened upon the central rod or bearing, Y, secured to each of the arms D, in which bearings the drive shaft J is journaled. That is to say, said sleeve has a spiral groove, Z, into which the pin projects, so that by moving the collar laterally, by means of its connecting rods and their operating lever, said sleeves or collars, with their appropriate clutches, W and W', may be moved either toward or from the adjacent sides of their respective sprocket wheels. As these spiral grooves, Z, are turned in opposite directions, it follows that by engaging one of the sprocket wheels with its appropriate clutch, the other will be disengaged, and vice versa; while, when the lever, U, is placed midway between the two notches, Q and S, or with its pawl resting in the middle notch, R, neither one of the two clutches will be engaged with its appropriate sprocket wheel, I or I', which is permitted to run free or loosely upon the axle.

In order to engage either one of the two sprocket wheels with the main shaft or axle, J, the latter is provided at each end with a rib or feather, $j$, adapted to engage a corresponding notch, $w$, in the clutch adjacent to it. It follows that, when the clutch, W or W', whichever it may be, is, by the combination and operation of the lever, U, connecting rods, or arms, M, and sliding sleeve, X, brought up against its appropriate sprocket wheel, that particular wheel will engage the main drive shaft of the machine, and thereby revolve the driving wheel, B. If lever, U, is placed in the middle notch, R, of the segment, its connecting arms, M, will be so arranged that both clutches will be disengaged from their respective sprocket wheels, so that the same are free to revolve without engaging the drive wheel, as, for example, when "coasting" or going down hill, where no propulsory power is required. On the other hand, if the machine is to go up hill, where great power but small speed is required, then the rider, by throwing the lever backward, as indicated by the arrow in Fig. 1, will cause the sliding sleeve and its clutch to engage the large sprocket wheel, I', connecting it to the main drive shaft and to the drive wheel, B, so that there will be considerable leverage upon the main shaft and wheel, with a comparatively low speed. After level ground has been reached, or when there is no further necessity for great power and low speed, the lever is thrown forward, which through the operation of the sliding sleeves with their appropriate clutches, has the effect of disengaging the large sprocket wheel and, in its place, engaging the smaller one with the main shaft and drive wheel, B, so that we now get an increase of speed with a correspondingly diminished exercise of power.

It will be observed that this mechanism can easily be applied to bicycles of the different makes now on the market, without much trouble, and that it enables the operator or rider of the machine to control the speed of his machine at will without dismounting from the saddle. In other words, when going up hill or over rough ground, he can so adjust the pedals as to increase the power brought to bear upon the drive wheel, by proportionally diminishing the speed of his machine, while, on the other hand, simply by moving the lever in the opposite direction, he is enabled to increase his speed without a corresponding increase of effort on his part. In other words, the rider has complete control of the speed and power of his machine, and can regulate the same, simply by pushing the lever forward or back, as circumstances may require.

Having thus described my invention, I claim and desire to secure by Letters Patent of the United States—

In a bicycle, the combination with the frame, the bearings secured thereto provided with a spiral groove, the shaft journaled in said bearings, the sliding clutches carried by said shaft, the sleeves having inwardly projecting pins engaging with said grooves, the connecting rods and lever for operating the clutches, the differential sprocket wheels loosely mounted in said shaft having a clutch with which the sliding clutches engage, the rib or feather on the drive shaft, the drive chains, the pedals and sprocket wheels on the crank shaft, substantially as described.

In testimony that I claim the foregoing as my own I have hereunto affixed my signature in presence of two witnesses.

WARREN H. ERB.

Witnesses:
LOUIS BUCKENS,
GEORGE F. COPIN.